US011816271B2

United States Patent
Holland

(10) Patent No.: US 11,816,271 B2
(45) Date of Patent: Nov. 14, 2023

(54) CONTROL SYSTEM, GESTURE RECOGNITION SYSTEM, VEHICLE, AND METHOD FOR CONTROLLING GESTURE RECOGNITION SYSTEM

(71) Applicant: Nissan Motor Co., Ltd., Yokohama (JP)

(72) Inventor: Christian Michael Holland, Bedfordshire (GB)

(73) Assignee: Nissan Motor Co., Ltd., Yokohama (JP)

( * ) Notice: Subject to any disclaimer, the term of this patent is extended or adjusted under 35 U.S.C. 154(b) by 227 days.

(21) Appl. No.: 17/620,156

(22) PCT Filed: May 21, 2021

(86) PCT No.: PCT/JP2021/019470
§ 371 (c)(1),
(2) Date: Dec. 17, 2021

(87) PCT Pub. No.: WO2022/018953
PCT Pub. Date: Jan. 27, 2022

(65) Prior Publication Data
US 2023/0152898 A1    May 18, 2023

(30) Foreign Application Priority Data

Jul. 23, 2020  (GB) ..................... 2011430

(51) Int. Cl.
*G06F 3/01*    (2006.01)
*B60R 16/02*   (2006.01)

(52) U.S. Cl.
CPC .............. *G06F 3/017* (2013.01); *B60R 16/02* (2013.01); *G06F 3/016* (2013.01)

(58) Field of Classification Search
None
See application file for complete search history.

(56) References Cited

U.S. PATENT DOCUMENTS

| | | | | |
|---|---|---|---|---|
| 9,477,317 | B1* | 10/2016 | Clements | G06F 3/017 |
| 9,965,037 | B2* | 5/2018 | Hong | G06F 3/0416 |
| 11,477,327 | B2* | 10/2022 | Wells-Rutherford | H04M 3/568 |

(Continued)

OTHER PUBLICATIONS

V.I. Pavlovic et al., Visual Interpretation of Hand Gestures for Human-Computer Interaction: A Review, IEEE Transactions on Pattern and Machine Intelligence, Jul. 1977, pp. 677-695, vol. 19, No. 7, IEEE, U.S.

*Primary Examiner* — Fekadeselassie Girma

(74) *Attorney, Agent, or Firm* — Global IP Counselors, LLP

(57) ABSTRACT

A control system controls a gesture recognition system of a vehicle. The control system identifies a position of a body part with respect to a gesture recognition area in accordance with a detection signal of a sensor system. The control system specifies a haptic feedback signal based on the position of the body part with respect to the gesture recognition area. The control system outputs the haptic feedback signal to a haptic feedback system. The haptic feedback signal is configured to cause the haptic feedback system to output non-contact haptic feedback indicating the position of the body part with respect to the gesture recognition area toward a vehicle occupant.

19 Claims, 12 Drawing Sheets

(56) References Cited

U.S. PATENT DOCUMENTS

| | | | | |
|---|---|---|---|---|
| 2002/0140633 | A1* | 10/2002 | Rafii | G06F 3/04847 |
| | | | | 345/8 |
| 2012/0001742 | A1* | 1/2012 | Nozoe | B60Q 9/007 |
| | | | | 701/49 |
| 2016/0216763 | A1* | 7/2016 | Vanhelle | G06F 3/0362 |
| 2017/0336903 | A1* | 11/2017 | Rivaud | G06F 3/0416 |
| 2018/0078854 | A1* | 3/2018 | Achmueller | G07F 17/3209 |
| 2018/0345994 | A1* | 12/2018 | Goerick | G06F 3/017 |
| 2019/0102986 | A1* | 4/2019 | Nelson | G06F 3/04815 |
| 2019/0171289 | A1* | 6/2019 | Chadha | G09B 21/00 |
| 2019/0187792 | A1* | 6/2019 | Basehore | G06F 3/017 |
| 2019/0235630 | A1* | 8/2019 | Verbeke | B60W 50/16 |
| 2019/0346938 | A1* | 11/2019 | Wang | G06F 3/0446 |
| 2019/0375431 | A1* | 12/2019 | Garcia | B62D 1/06 |
| 2020/0004337 | A1* | 1/2020 | Hendren | G06F 1/1616 |
| 2020/0019245 | A1* | 1/2020 | Ganadas | G06F 3/016 |

* cited by examiner

CONTROL SYSTEM, GESTURE RECOGNITION SYSTEM, VEHICLE, AND METHOD FOR CONTROLLING GESTURE RECOGNITION SYSTEM

CROSS-REFERENCE TO RELATED APPLICATIONS

This application is a U.S. national stage application of International Application No. PCT/JP2021/019470, filed on May 21, 2021.

BACKGROUND

Technical Field

The present disclosure relates to a gesture recognition system for a vehicle. Aspects of the present invention relate to a control system, a gesture recognition system, a vehicle, and a method for controlling a gesture recognition system.

Background Information

A state-of-the-art vehicle, comprising a gesture recognition system configured to observe a volume of space inside the vehicle and to detect gestures executed inside the observed volume of space based on an individual's location and/or a series of movements, is known from the prior art.

SUMMARY

In many cases, such a gesture recognition system is configured to observe an individual's specific body part, such as a hand, one or more fingers, or the individual's arm, which can be associated with recognized gestures or a database of control behaviors corresponding to gestures.

If the detected gesture corresponds to one of the recognizable gestures, the gesture recognition system can be configured to control one or more operations of the vehicle. This control method based on gestures makes it possible for a driver to control various operations of the vehicle while maintaining visual attention on the road, thereby improving road safety.

The object of the known gesture recognition system is, in particular, to ensure highly reliable gesture recognition even when carrying out a movement in suboptimal conditions (conditions that are not optimal), such as under poor lighting conditions.

The aspects and embodiments of the present invention provide a control system, a gesture recognition system, a vehicle, and a method for controlling a gesture recognition system as described in the appended Claims.

According to one aspect of the present invention, a control system for a vehicle gesture recognition system is provided. The gesture recognition system comprises a sensor system that observes a volume of space inside a vehicle cabin, identifies the position of a body part of a vehicle occupant inside the volume of space, and identifies a gesture executed by the body part within a gesture recognition area defined inside the volume of space, and a haptic feedback system that outputs non-contact haptic feedback toward the vehicle occupant.

The control system has one or more control devices. The control device is configured to receive a detection signal including information indicating the position of a body part inside the volume of space, identify the position of the body part with respect to the gesture recognition area in accordance with the detection signal, specify a haptic feedback signal based on the position of the body part with respect to the gesture recognition area, and output the haptic feedback signal to the haptic feedback system. The haptic feedback signal is configured to cause the haptic feedback system to output, toward the vehicle occupant, non-contact haptic feedback indicating the position of the body part with respect to the gesture recognition area.

Preferably, the output of the haptic feedback guides the vehicle occupant toward a gesture recognition area, which can be an area in the vehicle optimized for gesture recognition, and the gesture recognition system can reliably recognize a gesture in this area under suboptimal conditions (cabin interior conditions that are not optimal). A "cabin interior" is any space inside the vehicle provided to accommodate vehicle occupants.

In addition, the gesture recognition area is a three-dimensional area, that is, a space having a volume (volume of space) in order to achieve optimal gesture recognition. The gesture recognition area is set in accordance with the lighting conditions of the cabin interior and/or the configuration of the sensor system. In addition, a body part is any part of a body suitable for executing control based on gestures, including fingers, hands, or arms of a vehicle occupant.

Optionally, one or more control devices are configured to identify at least one of the position of a body part in the volume of space, the position of a gesture recognition area inside the volume of space, the direction of the gesture recognition area with respect to the position of the body part, the proximity of the body part to the gesture recognition area, and the distance between the body part and the gesture recognition area along a first axis, to thereby identify the position of the body part with respect to the gesture recognition area.

As will be clarified in the description below, the first axis may be any axis suitable for controlling the haptic feedback. For example, the first axis may be an axis in the longitudinal direction of the vehicle such that the output of the haptic feedback can be controlled in accordance with the longitudinal positioning of the body part with respect to the gesture recognition area.

As another example, the first axis may be an axis that extends between the haptic feedback system and a target position, or an axis that extends between the sensor system and the target position. In this manner, the output of the haptic feedback may be configured to guide the movement of the body part toward the gesture recognition area along a specific axis.

In one embodiment, the haptic feedback signal is configured to cause the haptic feedback system to output a haptic feedback toward an area in the cabin interior.

Optionally, one or more control devices are configured to specify at least one of the magnitude of the haptic feedback, the position in the cabin interior to which the haptic feedback area is oriented, and the size of the haptic feedback area, to thereby specify the haptic feedback signal.

Optionally, the haptic feedback area is a circular area and the radius of the haptic feedback area is specified. Preferably, each of these haptic feedback parameters can be configured to intuitively indicate the location of the gesture recognition area with respect to the body part.

In one embodiment, one or more control devices are configured to specify the magnitude of the haptic feedback and/or the size of the haptic feedback area, based on the proximity of the body part to the gesture recognition area. In this manner, the magnitude, that is, the force of the haptic feedback, and/or the size of the haptic feedback area may be increased as the body part approaches the gesture recognition area and decreased as the body part moves away from the gesture recognition area, or vice versa.

Optionally, one or more control devices are configured to determine the magnitude of the haptic feedback and/or the size of the haptic feedback area based on the distance between the body part and the gesture recognition area along the first axis. In this manner, the output of the haptic feedback may be configured to guide the movement of the body part along the first axis, for example in the longitudinal direction, toward the gesture recognition area.

In one embodiment, one or more control devices may be configured to specify the position in the cabin interior toward which the haptic feedback area is oriented, based on the position of the body part inside the volume of space, and the direction of the gesture recognition area with respect to the position of the body part. For example, if the gesture recognition area is arranged in a direction in which a fingertip extends (with respect to the hand), the haptic feedback area may be oriented toward the fingertip of the vehicle occupant.

Optionally, one or more control devices are configured to detect a reference point of a body part and identify the position of the reference point within the volume of space based on the detection signal, to compare the position of the reference point and a target position within the gesture recognition area, and to specify a vector between the target position and the position of the reference point, to thereby identify the position of the body part with respect to the gesture recognition area. In this manner, a plurality of unique points may be conveniently compared on a coordinate system to identify the position of the body part with respect to the gesture recognition area, and the relative positions may be represented by means of a vector therebetween. The vector indicates the direction of a straight line that connects two points and the direction in which the straight line extends. The vector may be three-dimensional and include a first distance along the first axis, a second distance along a second axis, and a third distance along a third axis. The second axis extends in a first plane that passes through the gesture recognition area and that is perpendicular to the first axis. The third axis extends perpendicular to the second axis in the first plane.

In one embodiment, one or more control devices may be configured to specify a point offset from the position of the reference point in the direction of the target position, to thereby identify the position in the cabin interior toward which the haptic feedback area is oriented. For example, the reference point may be the center of the vehicle occupant's palm, and the offset point may be to the left or to the right of the finger or the wrist with respect to the reference point. This is useful for indicating a relative direction of the gesture recognition area.

Optionally, one or more control devices are configured to scale a vector between the target position and the position of the reference point and subjects the position of the reference point to parallel translation based on the scaled vector, to thereby specify the offset point that is offset from the position of the reference point in the direction of the target position.

In one embodiment, one or more control devices are configured to specify the size of the vector to thereby specify the proximity of the target position with respect to the position of the reference point.

Optionally, one or more control devices are configured to determine either the magnitude of the haptic feedback or the size of the haptic feedback area, based on the proximity of the target position with respect to the position of the reference point, and the one or more control devices are configured to specify the other, that is, the magnitude of the haptic feedback or the size of the haptic feedback area, based on the distance between the target position and the position of the reference point along the first axis.

In one embodiment, one or more control devices are configured to determine the distance between the target position and the position of the reference point along the first axis based on a vector. For example, components of a vector aligned with the first axis can be identified.

Optionally, the detection signal includes image data identified by the sensor system. The sensor system may be arranged so as to observe the volume of space in the cabin interior, and one or more control devices may be configured to detect a body part inside the volume of space and to identify the position of the body part inside the volume of space based on the image data.

In one example, the haptic feedback system may take the form of an ultrasonic wave system. Optionally, the haptic feedback system includes an array of a plurality of ultrasonic devices, and the haptic feedback signal is configured to cause the haptic feedback system to output a haptic feedback in the form of an ultrasonic beam.

According to another aspect of the present invention, a gesture recognition system for a vehicle is provided. The gesture recognition system comprises a control system as explained in the above-described aspect of the present invention, and a sensor system including one or more sensors configured to observe a volume of space in a cabin interior, and to output, to the control system, a detection signal including information indicating the position of a body part of a vehicle occupant inside the observed volume of space.

Optionally, one or more sensors are configured to output, to the control system, a gesture signal that includes information indicating a gesture that is executed by a body part of a vehicle occupant within the gesture recognition area. One or more control devices of the control system are further configured to receive the gesture signal to thereby identify the gesture that is executed by the body part in accordance with the gesture signal. In this matter, the gesture recognition system can reliably identify the gesture that is executed within the gesture recognition area.

In one example, the control system can be configured to use a skeleton-based algorithm to thereby identify the gesture executed by the body part. A skeleton-based algorithm can provide high-speed and accurate gesture recognition.

Optionally, the control system is further configured to control one or more behaviors of the vehicle in accordance with the identified gesture.

In one embodiment, the gesture recognition system comprises a haptic feedback system having one or more haptic feedback devices configured to output a non-contact haptic feedback in accordance with the haptic feedback signal.

Optionally, the one or more haptic feedback devices include an array of a plurality of ultrasonic transducers.

According to another aspect of the present invention, a vehicle comprising the control system in the previously described aspect of the present invention, or the gesture recognition system described in this other aspect of the present invention is provided.

According to this other aspect of the present invention, a corresponding method for controlling a gesture recognition system of a vehicle is provided. In particular, the gesture recognition system comprises a sensor system equipped with one or more sensors configured to observe a volume of space inside a vehicle cabin, and a haptic feedback system configured to output non-contact haptic feedback toward a vehicle occupant in the cabin interior. This method comprises a step for controlling the sensor system, observing a volume of space, and specifying a detection signal including information indicating the position of a body part of a vehicle occupant inside the volume of space, a step for identifying the position of the body part with respect to a gesture recognition area defined inside the volume of space in accordance with the detection signal, a step for specifying a haptic feedback signal based on the position of the body part with respect to the gesture recognition area, and a step for controlling a haptic feedback system based on the haptic feedback signal, wherein the haptic feedback signal is configured to output non-contact haptic feedback toward the vehicle occupant indicating the position of the body part with respect to the gesture recognition area.

The various aspects, embodiments, examples, and alternatives described in the preceding paragraphs, Claims and/or the following descriptions, drawings, and in particular the individual features thereof, are explicitly intended to be interpreted independently, or in any combination thereof, within the scope of the present application. That is, all embodiments and/or features of any embodiment can be combined in any manner and/or combination, as long as such features are not compatible. The applicant reserves the right to modify the originally submitted claims or to submit new claims accordingly. This includes the right to amend the originally filed claims to depend from other claims and/or incorporate the features thereof, even if not originally recited in the claims.

By means of the present invention it is possible to achieve the effect of ensuring highly reliable gesture recognition even when carrying out a movement under suboptimal conditions, such as under poor lighting conditions.

BRIEF DESCRIPTION OF THE DRAWINGS

Referring now to the attached drawings which form a part of this original disclosure.

DETAILED DESCRIPTION OF EMBODIMENTS

Figure 1:
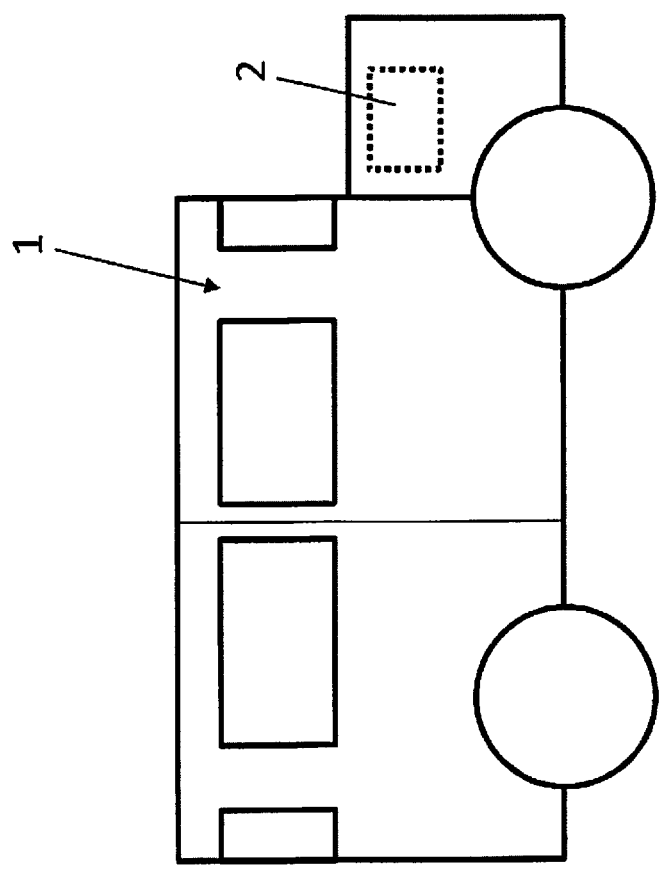
FIG. 1 is a schematic view showing a vehicle according to one embodiment of the present invention.

An embodiment of the present invention relates to a gesture recognition system for a vehicle. Preferably, the gesture recognition system includes a haptic feedback system for guiding a vehicle occupant toward an area in the vehicle optimized for gesture recognition, and the gesture recognition system can reliably recognize a gesture within this area regardless of changes in the cabin interior conditions.

For example, in a moving vehicle, the lighting conditions can change significantly, and the amount of background noise may make tracking and recognition difficult. Under such conditions, the gesture recognition ability may be limited to the extent that gestures can be reliably recognized only when executed within a prescribed area of the cabin.

In order to address this problem, the present invention is configured to observe a volume of space inside a vehicle cabin in an area of the vehicle cabin in which the reliability of the gesture recognition system is maximized, and to identify the position of a gesture of a body part of a vehicle occupant, such as the hand.

In the following description, this three-dimensional area, i.e., volume of space, for optimal gesture recognition is referred to as a gesture recognition area.

Preferably, in the present invention, the position of the body part with respect to the gesture recognition area is utilized to thereby specify a haptic feedback output that intuitively indicates the proximity and/or the relative direction of the gesture recognition area with respect to the body part. As a result, such a haptic feedback can use force-based feedback that does not interrupt the visual attention of the vehicle occupant to thereby guide the movement of the body part toward the gesture recognition area.

As will be clarified in the following description, various features of the haptic feedback may be configured for this purpose, particularly to indicate the following elements:

i) Direction of the gesture recognition area relative to the body part ii) Distance between the gesture recognition area and the body part in one or more dimensions For example, the overall proximity to the gesture recognition area can be indicated by increasing or decreasing the magnitude of the haptic feedback, i.e., the force, in accordance with the proximity of the body part to the gesture recognition area.

At the same time, the size of the haptic feedback output area may be increased or decreased to thereby indicate whether the body part is to the front/back, above/below, or to the left/right of the gesture recognition area, and the direction of the gesture recognition area with respect to the body part may be indicated by changing the position toward which the haptic feedback is oriented.

For example, the haptic feedback may be output toward the vehicle occupant's fingertip to thereby indicate that the gesture recognition area is in the direction in which the fingertip extends. In addition, the haptic feedback may be output toward the vehicle occupant's wrist to thereby indicate that the gesture recognition area is located in the opposite direction.

Such high-precision haptic feedback can guide the movement of the vehicle occupant, particularly the movement of a body part, inside a three-dimensional volume of space toward the gesture recognition area.

Figure 2:
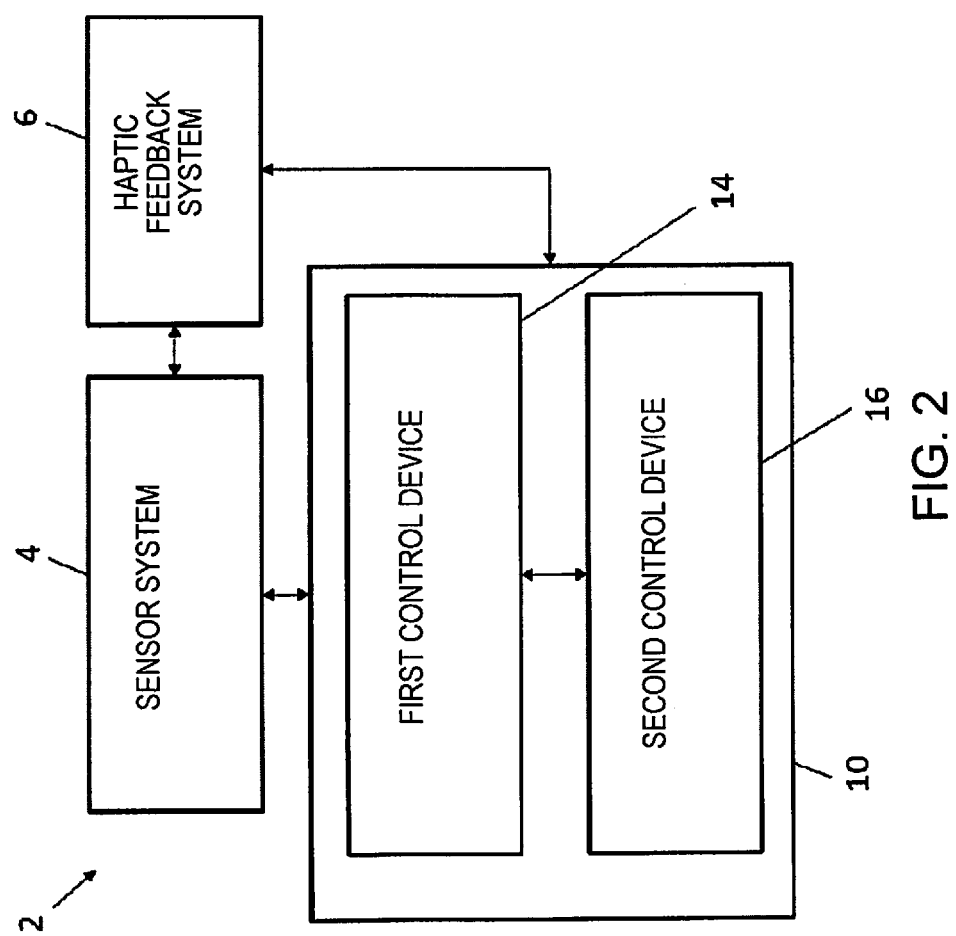
FIG. 2 is a schematic view of a gesture recognition system for the vehicle shown in FIG. 1, according to one embodiment of the present invention.
Figure 3:
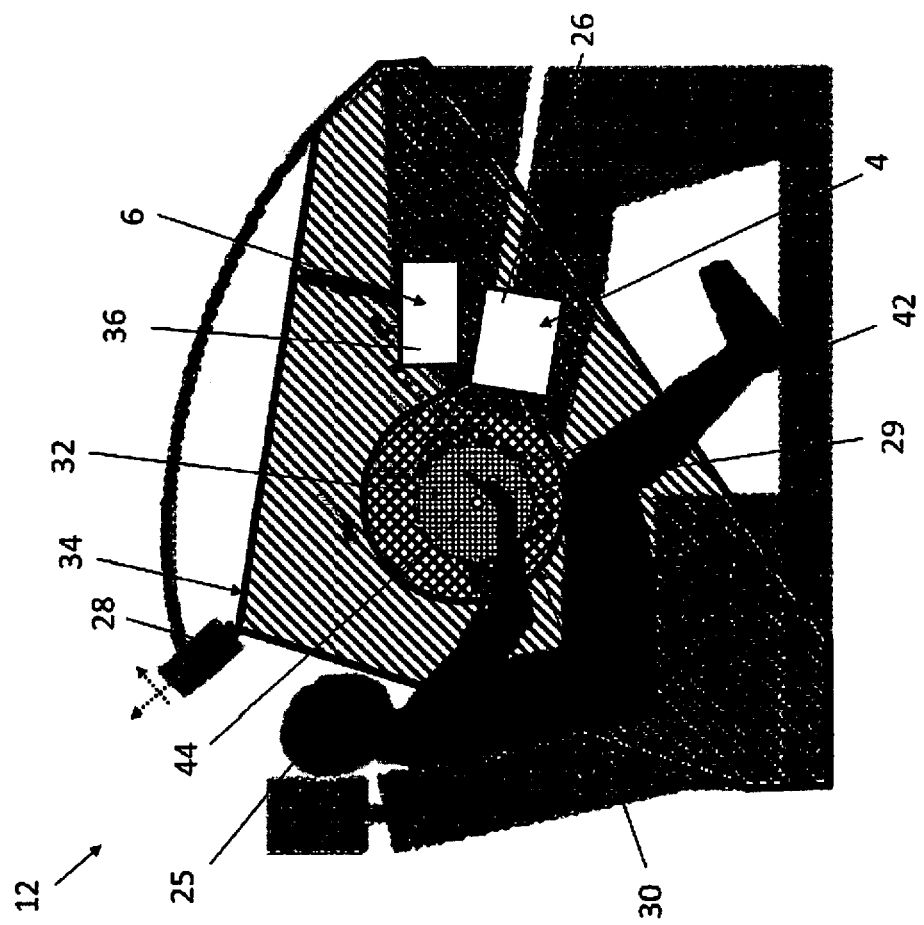
FIG. 3 is a schematic view showing an exemplary arrangement of the gesture recognition system shown in FIG. 2 in the cabin interior of the vehicle shown in FIG. 1.

FIG. 1 schematically shows an exemplary vehicle 1 that includes a gesture recognition system 2 according to one embodiment of the present invention. The gesture recognition system 2 is described in further detail with reference to FIGS. 2 and 3. FIG. 2 schematically shows one example of the gesture recognition system 2 according to one embodiment of the present invention, and FIG. 3 schematically shows one example of an arrangement of the gesture recognition system 2 in a cabin interior 12 of the vehicle 1.

As shown in FIG. 2, the gesture recognition system 2 includes a sensor system 4, a haptic feedback system 6, and a control system 10. The gesture recognition system 2 need not include the control system 10. That is, the control system 10 may control the gesture recognition system 2 using communication, without being installed in the vehicle 1.

The sensor system 4 includes one or more sensors. The one or more sensors are configured to observe a volume of space in the cabin interior 12 of the vehicle 1, to thereby generate a signal indicating the position, movement, and/or disposition of a specific body part, such as a hand, of the vehicle occupant in the observed volume of space.

For this purpose, the one or more sensors can include at least one of an infrared sensor, an ultrasonic sensor, a capacitive sensor, and/or an imaging camera for generating data suitable for identifying the position of the body part in the cabin interior. These data may be in the form of image data, capacitive data, or any other preferred form of computer vision data.

In the example shown in FIG. 3, the sensor system 4 includes a first sensor 26 and a second sensor 28, which are in the form of first and second imaging cameras.

The first sensor 26 is configured to observe a first volume of a space 30 and identify detection data (sensory data) corresponding to the movement, position, sequence of positions, or arrangement pattern of a body part 29, such as a hand, of a vehicle occupant 25 inside the first volume in the space 30.

As shown in FIG. 3, the first volume of the space 30 includes a gesture recognition area 32 and extends beyond the gesture recognition area 32. Based on these detection data (sensory data), the sensor system 4 is configured to generate a gesture recognition signal including information indicating one or more gestures executed by a body part inside the first volume of the space 34 and/or the gesture recognition area 32. The gesture recognition signal is output to the control system 10 and is used for identifying one or more vehicle behaviors to be controlled.

The second sensor 28 is configured to observe a second volume of a space 34 to thereby identify detection data (sensory data) corresponding to the position of the body part 29 within the second volume of the space 34. As shown in FIG. 3, the second volume of the space 34 includes the first volume of space 30 and expands beyond the first volume of space 30, so as to include a wider portion of the cabin interior 12. The second volume of space 34 can include a volume of space in which the vehicle occupant 25 is likely to be disposed. For example, the second volume can include a front passenger seat of the vehicle 1. It is thereby possible to identify the position of the body part 29 outside of the gesture recognition area 32.

Based on these detection data (sensory data), the sensor system 4 generates a body part detection signal including information indicating the position of the body part 29 inside the second volume of space 34. The body part detection signal is output to the control system 10 and is used to identify i) the position of the body part 29 with respect to the gesture recognition area 32, and ii) a haptic feedback signal for controlling the haptic feedback system 6.

In another example, the sensor system 4 can include a single sensor for determining both the body part detection signal and the gesture recognition signal. However, by using a plurality of sensors, the reliability of recognition and detection of target objects can be further improved.

As described above, the control system 10 is configured to process the body part detection signal and the gesture recognition signal for the following purposes.

i) Identify the position of the body part 29 with respect to the gesture recognition area 32, ii) control the haptic feedback output from the haptic feedback system 6 to thereby guide the body part 29 toward the gesture recognition area 32, and iii) identify the gesture executed by the body part 29 within the gesture recognition area 32. For this reason, the control device 10 can include one or more control devices, and each control device can include a control unit or a computation device having one or more electronic processors.

The one or more control devices or control units may be provided with a set of commands for executing control methods, such as the control method described in the present Specification. The set of commands may be embedded in the one or more electronic processors.

Alternatively, the set of commands can be provided as software executed by one or more of the electronic processors.

The set of commands may be embedded in a computer-readable storage medium (for example, a non-transient computer-readable storage medium). The computer-readable storage medium can have any mechanism for storing information in a format readable by a machine or an electronic processor/computation device. These include but are not limited to magnetic storage media (e.g., floppy (registered trademark) diskettes), optical storage media (e.g., CD-ROM), optical magnetic storage media, read-only memory (ROM), random access memory (RAM), erasable programmable memory (e.g., EPROM and EPPROM), flash memory, or electrical or other types of media for storing such information/instructions.

As shown in FIG. 2, in the present embodiment, the control device 10 includes a first control device 14 and a second control device 16.

The first control device 14 is a gesture recognition control device configured to process the gesture recognition signal to thereby identify a gesture carried out by the body part 29 based on the gesture recognition signal. "Identify a gesture executed by the body part 29" means that the first control device 14 generates a spatial gesture model corresponding to the position and/or movement of the body part 29 observed by the first sensor 26.

Various types of spatial gesture models are known in the technical field of gesture recognition, and will not be described in detail to avoid obscuring the present invention, however more information can be found, for example, in V. I. Pavlovic, R. Sharma, and T. S. Huang "Visual Interpretation of Hand Gestures for Human-Computer Interaction: A Review" published in IEEE Transactions on Pattern and Machine Intelligence, Vol. 19, No. 7, July 1997.

As demonstrated by V. I. Pavlovic, R. Sharma and T. S. Huang (1997), a spatial gesture model can be specified by means of various methods known in the present technical field, and can be executed using any suitable computer vision and/or image processing method.

For rapid processing, simplified detection and processing algorithms may be employed as well. For example, a "skeleton-based algorithm" using segment lengths and joint angle parameters of the body part 29 may be employed. Such a skeleton-based algorithm identifies the position and orientation of a segment, and the relationship between segments (for example, angle and relative position or orientation of a joint) in order to recognize a gesture.

In addition, a more simplified approach would be to use a recognition algorithm configured to identify a unique point of the body part 29, such as the end of a finger or the center of a hand/palm, and to track the position and/or movement of such a reference point. However, the body part 29 must exist at an optimal position in order to be able to identify the key points and to allow precise and accurate detection of the gesture that is being executed. Such a simplified algorithm becomes possible by means of optimized recognition conditions within the gesture recognition area 32. In order to provide control of the vehicle 1 based on a gesture, the first control device 14 may be further configured to compare the identified gesture with a database of gestures used for recognition. Gestures used for recognition may be associated with controlling one or more vehicle behaviors.

For example, a database of gestures used for recognition that are configured in a form corresponding to identified gestures may be stored in a storage device of the first control device 14, together with vehicle behaviors associated with each gesture for recognition. The first control device 14 may be configured to access the storage device, and use a known technique to compare a spatial gesture model and a gesture sequence to thereby determine whether the identified gesture corresponds to one of the gestures used for recognition. This process can, for example, include the use of a known pattern matching technique, and because only important parameters are analyzed, in this regard a simplified detection and processing algorithm can provide high-speed pattern matching.

If there is a correspondence between the identified gesture and a gesture for recognition, the control system 10 may output one or more corresponding control signals to control the behavior of the vehicle 1.

The second control device 16 is a haptic feedback control device configured to i) detect the body part 29, ii) identify the position of the body part 29 with respect to the gesture recognition area 32, and iii) identify the corresponding haptic feedback signal and send the same to the haptic feedback system 6.

For example, the body part detection signal can include image data, capacitive data, or any other preferred form of computer vision data that indicate the position of the body part 29 inside the second volume of space 34. The second control device 16 may be configured to detect the body part 29 to thereby generate a display of the body part 29 inside the second volume of space 34, based on these detection data (sensory data). For example, the body part 29 maybe displayed as a spatial model or a set of points on a coordinate system corresponding to the second volume of space 34. The display of the body part 29 can be specified by means of various methods known in the present technical field, as described above with respect to the spatial gesture model, and can be carried out using any suitable computer vision and/or image processing method.

In one example, as shown in FIG. 3, the second control device 16 may be configured to generate a single reference point 42, based on the body part detection signal representing the position of the body part 29 inside the second volume of space 34. Such a reference point 42 is the center of the palm or a point that can correspond to any other easily detectable feature of the body part 29. Based on this, when the body part 29 moves with respect to the sensors 26, 28, it becomes possible to monitor the position of the reference point 42, and the second control device 16 can identify a series of corresponding coordinate positions of the reference point 42 inside the second volume of space 34.

For ease of understanding, the coordinate system may correspond to one of the sensors 26, 28, or to the vehicle 1 itself. For example, the position of the reference point 42 may be specified on a coordinate system having a first axis aligned with the longitudinal axis of the vehicle 1 (in a front-rear direction), a second axis disposed on a transverse plane with respect to the first axis and that extends in the lateral direction (left-right direction) across the vehicle 1, and a third axis disposed in the transverse plane and that extends in the vertical direction (up-down direction) perpendicular to the second axis.

In order to identify the position of the body part 29 with respect to the gesture recognition area 32, the second control device 16 may use calibration data, and the calibration data include information relating to the shape, size, and position of the volume of the space forming the gesture recognition area 32 in the vehicle 1.

In this regard, it should be understood that the gesture recognition area 32 can take various forms in accordance with the calibration of the sensors 26, 28 and/or the specific configuration of the sensor system 4. Such calibration data may be stored in a storage device of the second control device 16, or be received from the sensor system 4, for example.

In one example, as shown in FIG. 3, the gesture recognition area 32 is in the form of a spherical volume of space, and the second control device 16 has calibration data relating to the position of the center and the size of the radius of the spherical volume of space in the vehicle.

The second control device 16 is configured to identify a target position 44 at the center of the gesture recognition area 32 and a threshold proximity to the target position 44 based on the calibration data. The proximity threshold indicates whether the body part 29 is disposed inside or outside the boundary of the spherical shape of the gesture recognition area 32. In this manner, the second control device 16 can use the coordinate-based comparison result between the reference point 42 and the target position 44 to thereby identify the direction and/or proximity of the gesture recognition area 32 with respect to the body part 29. In addition, the second control device 16 can detect whether the body part 29 is disposed inside or outside the gesture recognition area 32 by comparing the measured threshold proximity.

As will be clarified in the following description, the second control device 16 uses the direction and/or proximity of the reference point 42 with respect to the target position 44 to thereby specify the haptic feedback signal for indicating the relative position of the gesture recognition area 32 with respect to the vehicle occupant 25.

The haptic feedback system 6 will be further described with reference to FIGS. 4 and 5. In general, the haptic feedback system 6 includes one or more haptic feedback devices configured to output haptic feedback toward the vehicle occupant 25 in accordance with the haptic feedback signal.

The haptic feedback control devices can include any non-contact or mechanical haptic feedback device, such as an ultrasonic control device, an air wave control device, or an air vortex control device. As a result, the haptic feedback system 6 is preferably configured to provide non-contact haptic feedback that generates pressure, referred to as a "haptic feedback area." For example, a commercial muRata (registered trademark) ultrasonic transducer array can be suitable for providing this form of haptic feedback.

The haptic feedback system 6 is configured to output haptic feedback based on the haptic feedback signal, and to control one or more from among the position, size, or shape of the haptic feedback area, the magnitude of the haptic feedback (force), or the corresponding pattern/frequency of the output.

Figure 4:
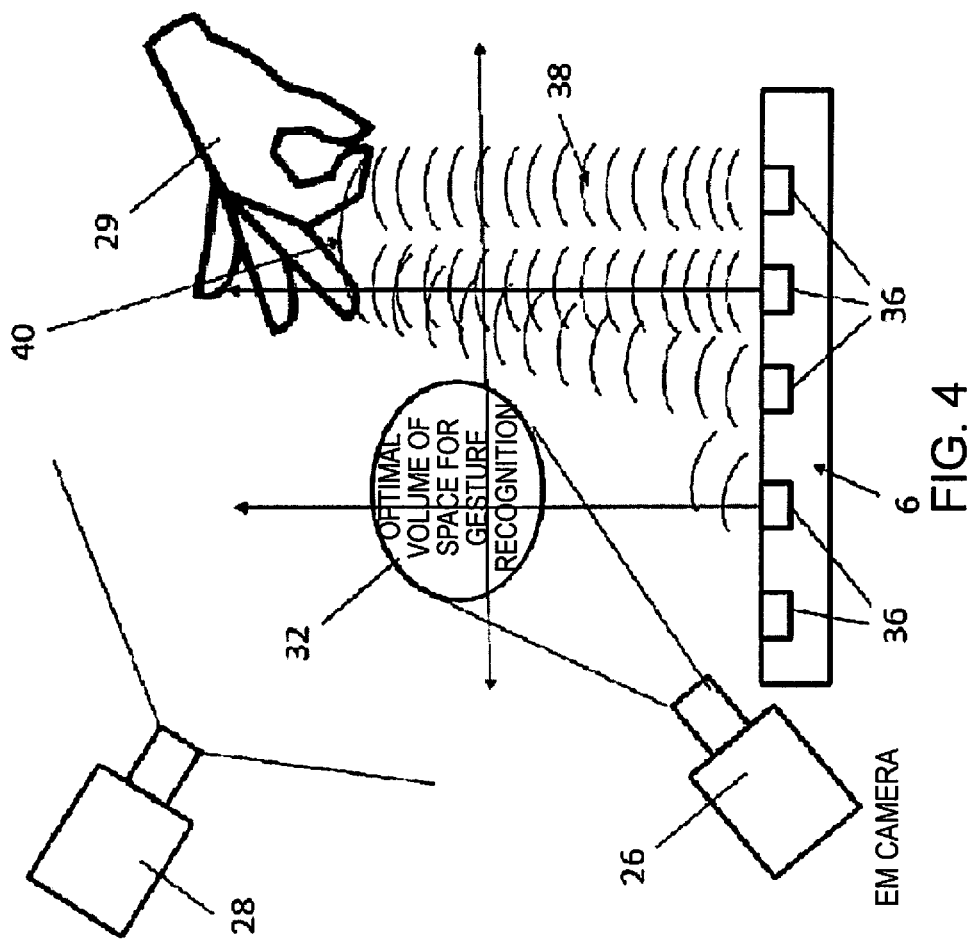
FIG. 4 is a schematic view showing an exemplary configuration of an output of haptic feedback from the gesture recognition system shown in FIG. 2.

FIG. 4 shows one example of the haptic feedback system 6 in the form of an ultrasonic wave system including an array of haptic feedback devices 36 for outputting ultrasonic waves to an occupant inside the vehicle 1. Each of the haptic feedback devices 36 may be, for example, an ultrasonic transducer. One or more of the haptic feedback devices 36 in the array may be selectively operated so as to output an ultrasonic beam 38 that creates a pressure region that exhibits so-called haptic force within a haptic feedback area 40, as shown in FIG. 4. As shown in FIG. 4, the vehicle occupant senses pressure when the haptic feedback area 40 is oriented toward the fingers of the vehicle occupant, for example.

The orientation of the ultrasonic beam 38 may be manipulated, and the shape, force, and orientation of the haptic feedback area 40 may be appropriately changed by controlling each of the haptic feedback devices 36. In addition, the position, size, and shape of the haptic feedback area 40 can be adjusted in the same manner as the force of the haptic feedback, by controlling the phase and intensity of each output of each of the haptic feedback devices 36, for example.

For clarity, a circular area 40 of the haptic feedback will be described in the following description by way of example. The force of the haptic feedback, the radius of the haptic feedback area 40, and the position of the haptic feedback area 40 are controlled to indicate the relative position of the gesture recognition area 32 with respect to the vehicle occupant 25.

FIGS. 5-9 illustrate how parameters that can control the haptic feedback can be configured to indicate the relative direction and/or proximity of the body part 29 with respect to the gesture recognition area 32.

Figure 5:
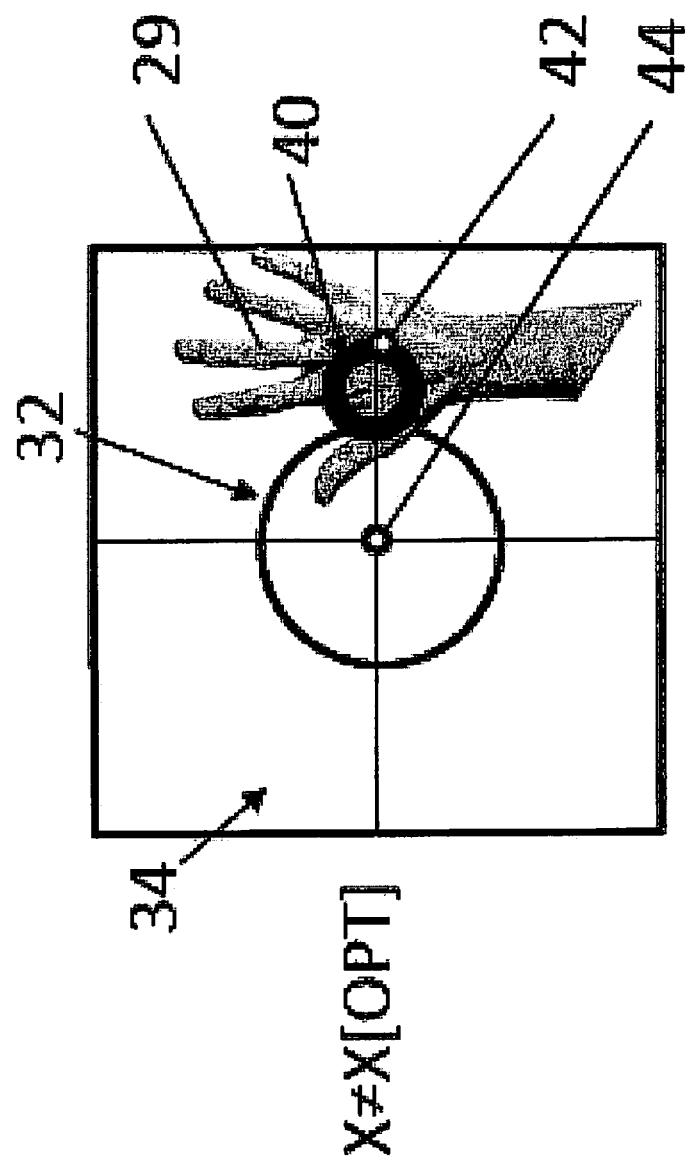
FIG. 5 is a schematic view showing an exemplary configuration of an output of haptic feedback from the gesture recognition system shown in FIG. 2.
Figure 6:
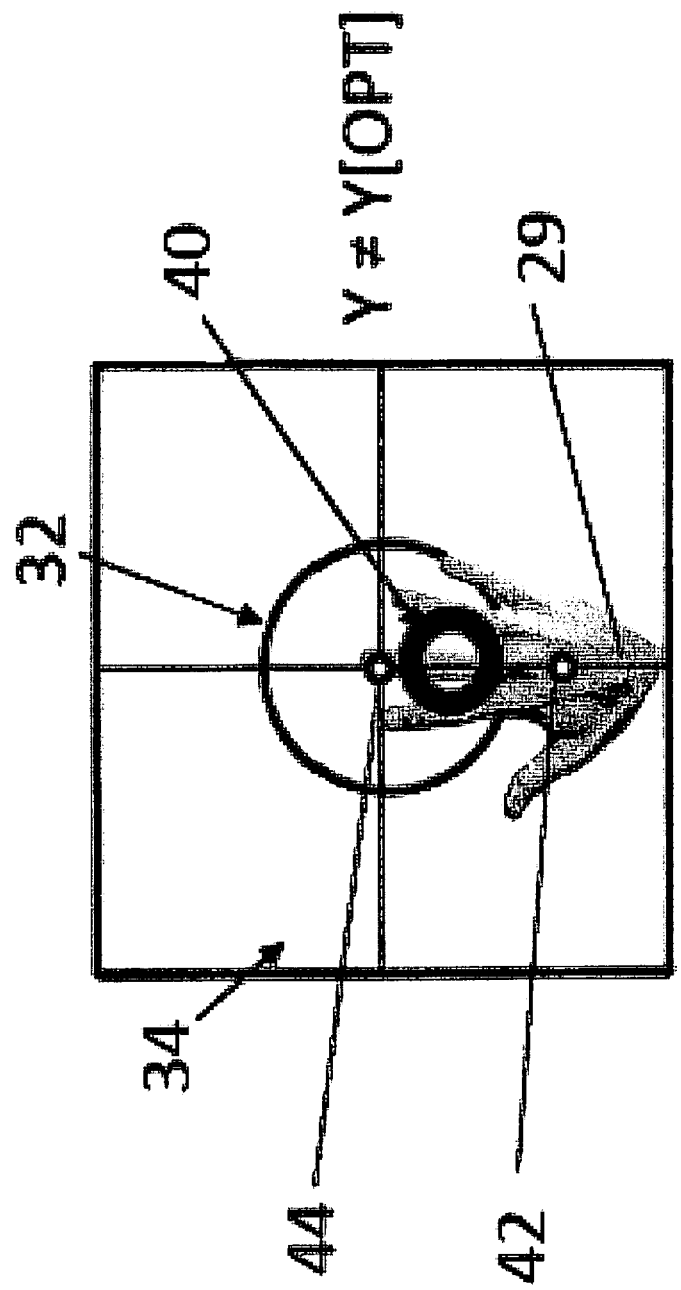
FIG. 6 is a schematic view showing an exemplary configuration of an output of haptic feedback from the gesture recognition system shown in FIG. 2.
Figure 7:
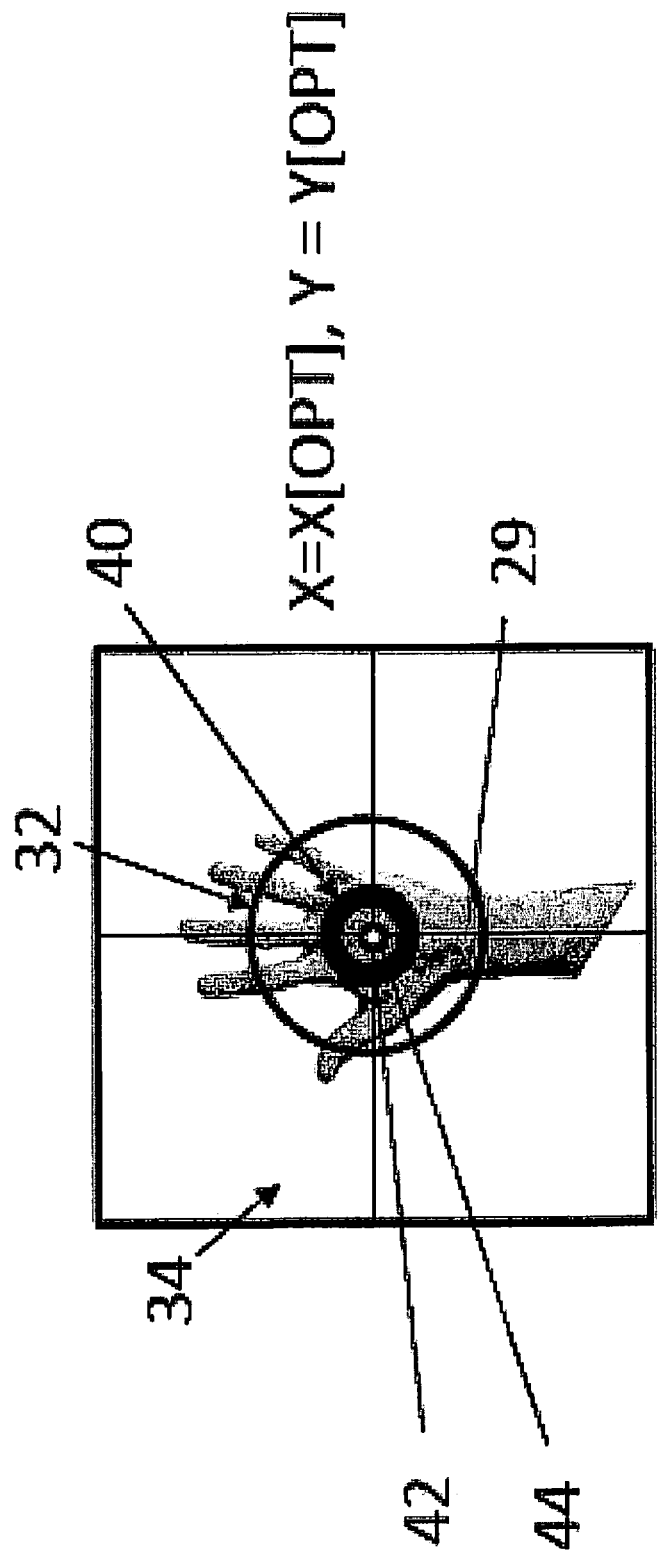
FIG. 7 is a schematic view showing an exemplary configuration of an output of haptic feedback from the gesture recognition system shown in FIG. 2.

FIGS. 5-7 indicate the position of the body part 29 in a cross section that extends across the vehicle 1. As shown, the direction in which the haptic feedback area 40 is oriented can be change within this cross section to indicate the orientation of the gesture recognition area with respect to the position of the body part 29.

In a first example shown in FIG. 5, the second control device 16 identifies that the reference point 42 on the body part 29 is located on the right side of the target position 44. As shown, the haptic feedback area 40 can thereby be oriented toward the leftward part of the body part 29, and, as a result, the haptic feedback area 40 is offset in the direction of the target position 44 with respect to the reference point 42.

In a second example shown in FIG. 6, the reference point 42 on the body part 29 is positioned below the target position 44, that is, toward the wrist. Accordingly, as shown, the haptic feedback area 40 may be oriented toward the upward part of the body part 29, that is, oriented toward the fingertip.

In a third example shown in FIG. 7, the reference point 42 on the body part 29 coincides with the target position 44 in the cross section. Accordingly, the haptic feedback area 40 is oriented toward the reference point 42, that is, the center of the palm. The haptic feedback area 40 is thereby positioned so as to confirm the position of the body part 29 within the gesture recognition area 32 in the transverse direction.

In the above-described example, the position toward which the haptic feedback area 40 is oriented corresponds to the direction of the gesture recognition area 32 with respect to the body part 29. In each example, the haptic feedback area 40 is oriented so as to be offset from the reference point 42 on a part of the body part 29 in the direction of the target position 44. That is, the control device 10 scales a vector between the target position and the position of the reference point (adjusts the size of the vector) and moves the position of the reference point based on the scaled vector, to thereby specify an offset point that is offset from the position of the reference point in the direction of the target position. By orienting the haptic feedback area 40 in this manner, the haptic feedback indicates the direction in which the body part 29 should be moved to approach the gesture recognition area 32.

In another example not limited to the foregoing, the haptic feedback may be configured in the opposite way, that is, such that the haptic feedback is oriented toward a position offset in the opposite direction with respect to the gesture recognition area 32 and the body part 29 is "pushed" toward the gesture recognition area 32, for example.

Figure 8:
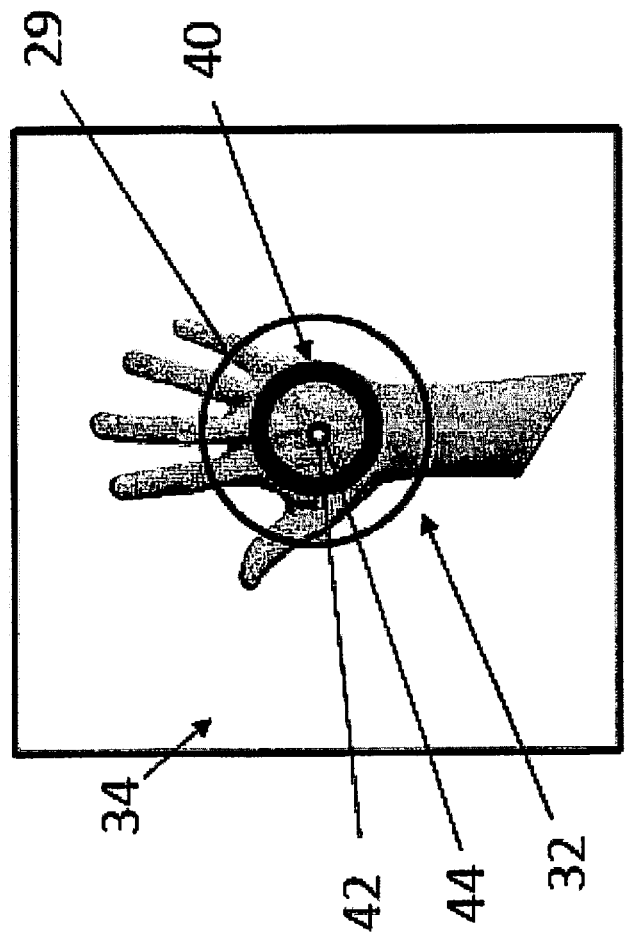
FIG. 8 is a schematic view showing an exemplary configuration of an output of haptic feedback from the gesture recognition system shown in FIG. 2.
Figure 9:
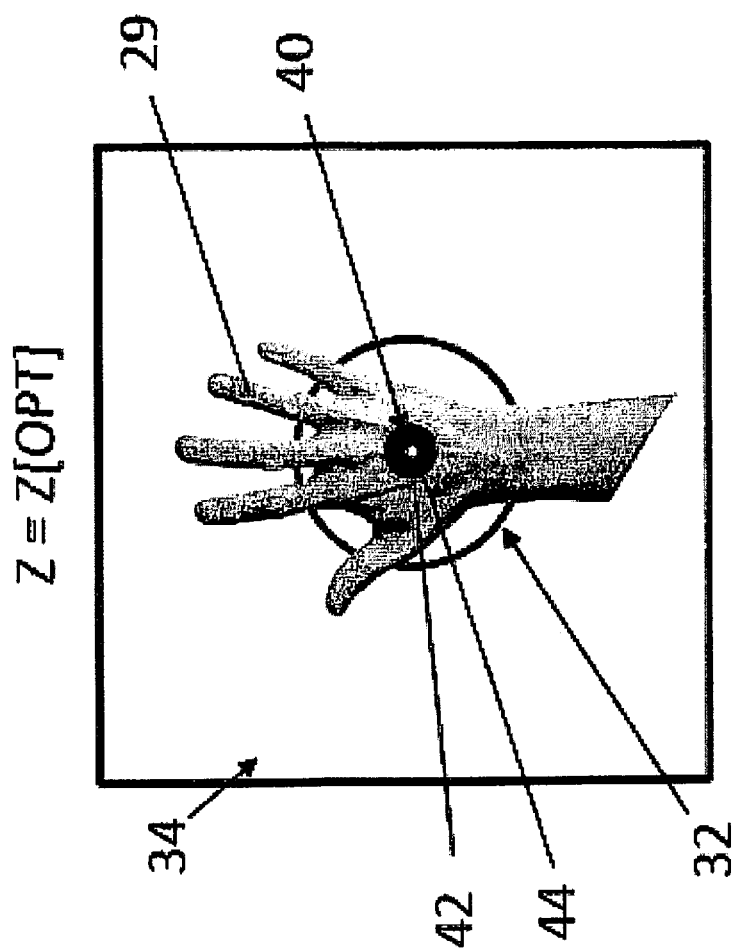
FIG. 9 is a schematic view showing an exemplary configuration of an output of haptic feedback from the gesture recognition system shown in FIG. 2.

As shown in FIGS. 8 and 9, it is possible to utilize the size of the haptic feedback area 40 to thereby indicate the direction in which the body part 29 should be moved in order to come closer to the gesture recognition area 32 along a prescribed axis. FIGS. 8 and 9 illustrate the body part 29 of the vehicle occupant 25 from a viewpoint oriented along the longitudinal axis of the vehicle 1.

As shown in these examples, the size of the haptic feedback area 40 can be changed to indicate a position in front of or behind the body part 29 with respect to the gesture recognition area 32. In particular, comparing FIGS. 8 and 9, the size of the haptic feedback area 40 may be decreased as the reference point 42 on the body part 29 moves rearward along the longitudinal axis from a first position shown in FIG. 8, that is, from the front of the target position 44, toward a second position shown in FIG. 9, which is closer to the target position 44. In addition, when the body part 29 moves further rearward beyond the target position 44, the size of the haptic feedback area 40 increases again.

In this manner, the size of the haptic feedback area 40 may depend on the distance between the body part 29 and the gesture recognition area 32 along the longitudinal axis. As a result, the size of the haptic feedback area 40 increases and decreases depending on whether the body part 29 approaches or moves away from the gesture recognition area 32 along the longitudinal axis of the vehicle, to thereby indicate the longitudinal position of the body part 29 with respect to the gesture recognition area 32. A similar principle can be applied in the same manner to any movement axis of the body part 29, including the vertical (up-down) axis and the transverse (left-right) axis.

The magnitude of the haptic feedback, that is, the force, may be configured to additionally or alternatively indicate the overall proximity of the body part 29 with respect to the gesture recognition area 32. For example, the force of the haptic feedback may be increased as the body part 29 moves toward the gesture recognition area 32 and reduced as the body part 29 moves away from the gesture recognition area 32.

Other configurations of the haptic feedback not limited to the above-described examples may appropriately indicate the position of the gesture recognition area 32 with respect to the body part 29. For example, in another configuration, the magnitude of the haptic feedback may be configured to indicate the direction of the gesture recognition area 32 with respect to the body part 29 along a specific axis, and the size of the haptic feedback area 40 may indicate the overall proximity with respect to the gesture recognition area 32.

Figure 10:
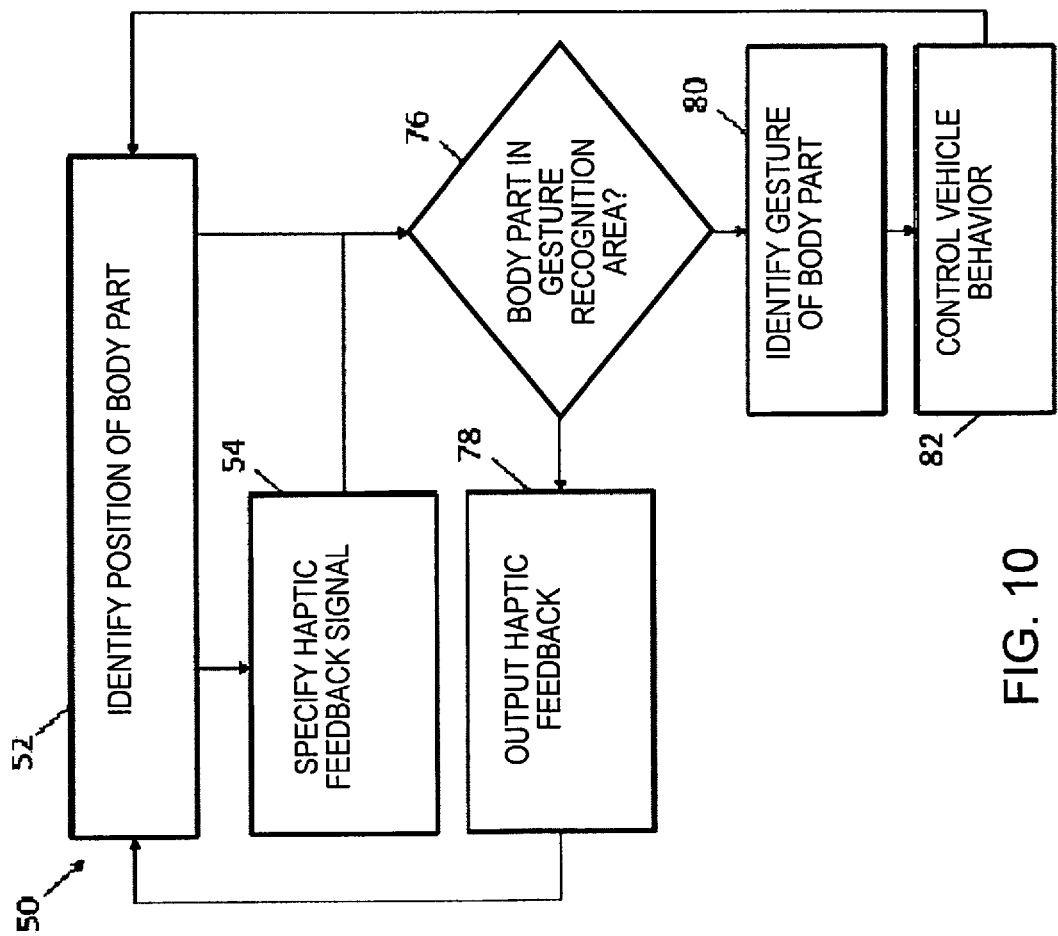
FIG. 10 is a schematic view showing an exemplary method for controlling the gesture recognition system shown in FIG. 2 according to one embodiment of the present invention.
Figure 11:
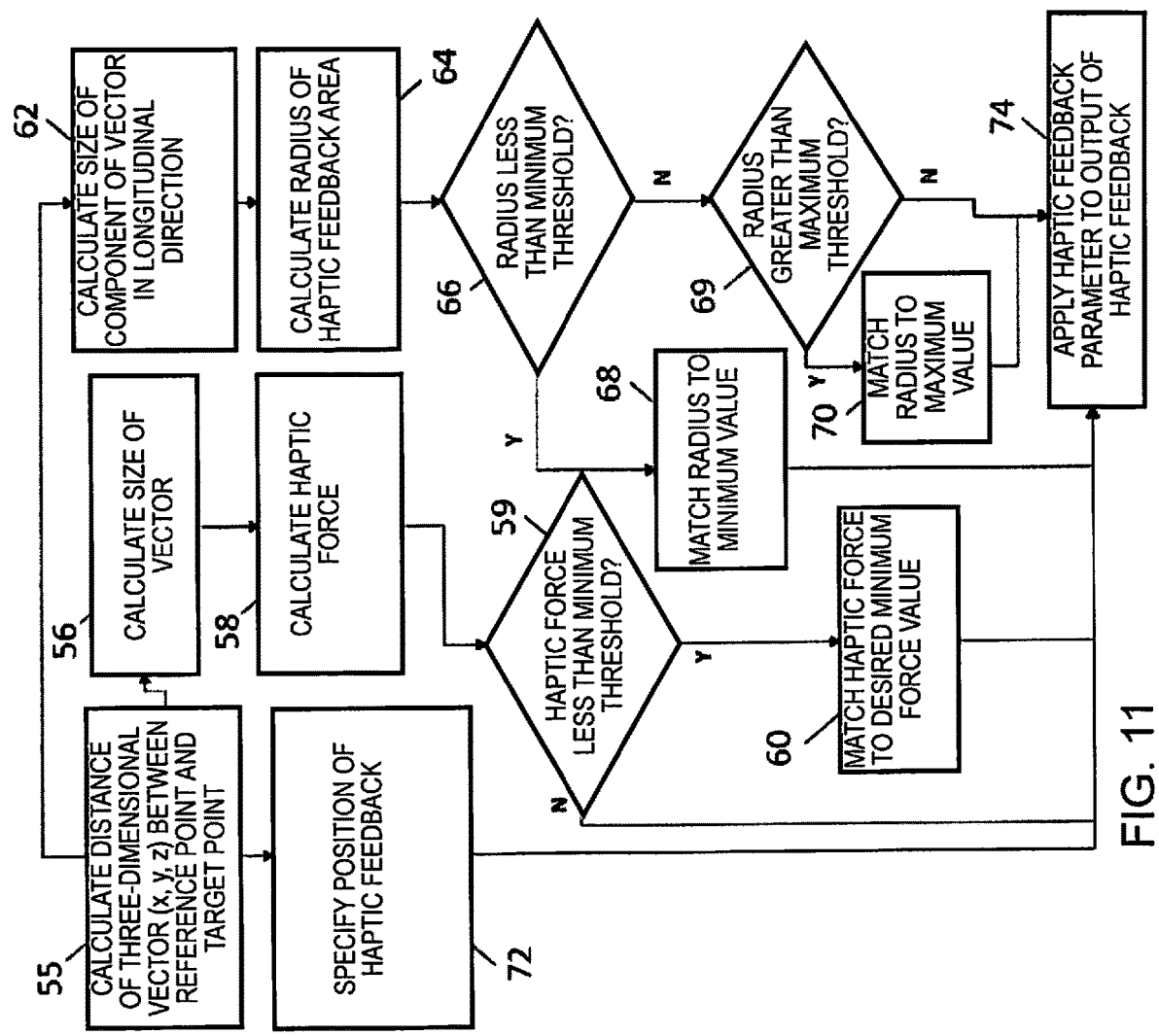
FIG. 11 is a schematic view of a subordinate method for identifying a haptic feedback signal in the method shown in FIG. 10.

An exemplary method 50 for operating the gesture recognition system 2 according to one embodiment of the present invention will be described below, with reference to FIGS. 10 and 11.

In Step 52, the gesture recognition system 2 is operated to identify the position of the body part 29 in the vehicle 1.

For example, the second sensor 28 may observe the second volume of space 34 to thereby identify the body part detection signal. The body part detection signal can be received by the control system 10, processed by the second control device 16, generate a display of the body part 29, and identify the coordinate position of the reference point 42 inside the second volume of space 34.

In Step 54, the gesture recognition system 2 is configured to specify a haptic feedback signal to be output to the haptic feedback system 6, based on the position of the body part 29 with respect to the gesture recognition area 32. In each example of the present invention, the haptic feedback signal can be specified based on one or more haptic feedback parameters, including the position, size, or shape of the haptic feedback area, the magnitude of the haptic feedback, and the pattern/frequency of the output. In Step 54, the parameter selected from among these haptic feedback parameters is specified based on the relative proximity and/or direction of the gesture recognition area 32 with respect to the body part 29.

In the following example, the control system 10 is operated to specify the magnitude of the haptic feedback, the position to which the haptic feedback area 40 is oriented, and the size of the haptic feedback area 40. For this purpose, Step 54 of method 50 can include the following Substeps 55-74 shown in FIG. 11.

The distance between the gesture recognition area 32 and the body part 29 and the direction of the gesture recognition area 32 with respect to the body part 29 can be conveniently specified in vector format by comparing the coordinates of the reference point 42 and the coordinates of the target position 44. Accordingly, in Substep 55, the control system 10 is operated so as to specify a vector between the target position 44 and the reference point 42 on the body part 29 at the center of the gesture recognition area 32.

For example, the target position 44 may be accessed from a storage device of the second control device 16. The control device 10 may compare the coordinates of the target position 44 and the coordinates of the reference point 42 to thereby specify a three-dimensional vector from one point to another point. The three-dimensional vector may include the respective distances along the first, second, and third axes of a common coordinate system.

In Substeps 56-60, the control system 10 specifies the magnitude of the haptic feedback based on the proximity of the body part 29 with respect to the gesture recognition area 32.

First, in Substep 56, the size of the vector between the reference point 42 and the target position 44 is calculated to thereby specify the overall proximity of the body part 29 to the gesture recognition area 32.

In Substep 58, the control system 10 specifies the magnitude of the haptic feedback based on the size of the vector. For example, the control system 10 can specify the force of the haptic feedback to be output according to the following formula.

Haptic force=(α×size of vector)

Here, α is a scalar coefficient. The scalar coefficient α may be suitably adjusted such that the haptic force indicates the relative proximity of the body part 29 with respect to the gesture recognition area 32. For example, it may be configured such that the maximum haptic force is output when the haptic force=1, and the minimum haptic force is output when haptic force=0. Accordingly, the maximum size of the vector can be specified based on the space of the cabin interior 12, and the scalar coefficient may be set such that the haptic force changes between 1 and 0 in accordance with the proximity of the body part 29 with respect to the gesture recognition area 32.

In another example, the force of the haptic feedback can be reduced with the proximity of the body part 29 to the gesture recognition area 32, and the control system 10 can specify, and output, the force of the haptic feedback in accordance with the following alternative formula.

Haptic force=1−(α×size of vector)

Here, α is a scalar coefficient that is adjusted to ensure that the haptic force changes between the maximum haptic force (when haptic force=1) and the minimum haptic force (when haptic force=0).

In Substep 59, in the method 50, it is determined whether the body part 29 is appropriately separated from the gesture recognition area 32 in order to activate the output of a haptic feedback of the gesture recognition system 2. For this purpose, the control system 10 may compare the magnitude of the haptic feedback with a minimum threshold of the haptic feedback, and when the magnitude is smaller than the minimum threshold, may set the magnitude of the haptic feedback to a minimum force value in Substep 60. The minimum force value may be, for example, zero haptic force. In this manner, when the vehicle occupant 25 it not attempting to control the gesture recognition system 2 and the body part 29 is appropriately distanced from the gesture recognition area 32, it is not necessary to output a haptic feedback.

In another example, the control system 10 may specify either zero or a non-zero amount of haptic force to be output, in accordance with the overall proximity of the body part 29 to the gesture recognition area 32. The zero or the non-zero amount of the haptic force may be output in accordance with a proximity threshold of the body part 29 to the gesture recognition area 32.

In Substeps 62-70, the control system 10 specifies the size of the haptic feedback area 40 based on the distance between the body part 29 and the gesture recognition area 32 along one axis selected from the first, second, or third axis of the coordinate system. In other words, the control system 10 can identify how proximate the body part 29 is to the gesture recognition area 32 in one of the longitudinal direction, lateral direction, or the vertical direction, and the control system 10 can adjust the size of the haptic feedback area 40 in accordance therewith.

Taking the longitudinal direction as an example, in Substep 62, the control system 10 identifies the distance between the body part 29 and the gesture recognition area 32 along the longitudinal axis, based on a vector between the reference point 42 and the target position 44.

In a simple example, one of the first, second, or third axis of the vector may be aligned with the longitudinal axis, and the distance between the body part 29 and the gesture recognition area 32 may be identified based on the size of the component of the vector in the longitudinal direction.

Next, in Substep 64, the control system 10 specifies the size of the haptic feedback area 40 based on the component of the vector in the longitudinal direction. For example, the control system 10 can specify the radius of the haptic feedback area 40 in accordance with the following formula:

$$\text{Radium} = \beta * \text{size of component of the vector in the longitudinal direction}$$

Here, $\beta$ is, for example, a scalar coefficient adjusted based on a representative size of the body part 29 to be observed.

In Substeps 66-70, in the method 50, the radius of the haptic feedback area 40 can be limited by means of an upper limit or lower limit value. The upper limit and the lower limit may correspond to the size of the body part 29 observed by the gesture recognition system such that the haptic feedback area 40 would not be too large or too small for the body part 29.

In this example, the radius of the haptic feedback area 40 is compared with a minimum radius threshold in Step 66, and if the radius is smaller than the minimum radius threshold, the size of the haptic feedback area 40 is set to a defined minimum radius in Step 68. The minimum radius may correspond to the width of a finger, for example.

Similarly, in Step 69, the radius of the haptic feedback area 40 is compared with a maximum radius threshold, and if the radius is larger than the maximum radius threshold, the radius of the haptic feedback area 40 is set to a defined maximum radius in Step 70. The maximum radius may correspond to the width of a finger, for example.

In Substep 72, the control system 10 specifies the position to which the haptic feedback area 40 is oriented based on i) the position of the body part 29 within the vehicle 1, and ii) the direction of the gesture recognition area 32 with respect to the body part 29.

In particular, the position toward which the haptic feedback area 40 is oriented is specified as a position between the reference point 42 and the target position 44 that is offset from the reference point 42 in the direction of the vector. Accordingly, the position toward which the haptic feedback area 40 is oriented may be specified in accordance with the following formula:

$$\text{Haptic feedback position } (X, Y, Z) = \text{Reference point position } (X, Y, Z) + (\mu * \text{vector } (Y, Z))$$

Here, X, Y, and Z are values along the first, second, and third axes. $\mu$ is, for example, a scalar coefficient that can be configured such that the position of the haptic feedback is limited to a distance from the reference point 42 (center of the palm) within a prescribed range. Accordingly, the scalar coefficient can be set in consideration of the size of the observed body part 29.

In this manner, the haptic feedback area 40 can be effectively associated with the position of the body part 29 along the longitudinal axis. For example, the haptic feedback area 40 may be oriented toward the same position along the longitudinal axis, similar to the reference point 42, and the haptic feedback area 40 may also be oriented toward a position offset (corrected) from the reference point 42 in the lateral direction and the vertical direction (second and third axes). In this manner, the position of the haptic feedback area 40 can indicate the relative position of the gesture recognition area 32 in the lateral direction and the vertical direction.

In Substep 74, the control system 10 specifies the haptic feedback signal based on the haptic feedback parameters specified in Substeps 55-72. Returning to FIG. 10, in Step 76, in the method 50, it is determined whether the body part 29 is disposed within the gesture recognition area 32.

For example, the control system 10 may identify the distance between the body part 29 and the gesture recognition area 32, and compare the distance with a threshold distance for identifying whether the body part 29 is disposed inside the gesture recognition area 32.

In one example, as described above, the control system 10 can identify the distance between the body part 29 and the gesture recognition area 32 based on the size of the vector between the reference point 42 and the target position 44.

Next, the size of the vector can be compared with the radius of the gesture recognition area 32 stored in the second control device 16 to define the threshold distance, for example. If the size of the vector is larger than the threshold distance, the control system 10 can infer that the body part 29 is outside of the gesture recognition area 32.

Accordingly, in Step 78, the control system 10 can output the haptic feedback signal specified in Step 54 to the haptic feedback system 6, to thereby cause the haptic feedback system to generate a haptic feedback indicating the relative position of the gesture recognition area 32 with respect to the vehicle occupant 25.

For example, the array of the haptic feedback devices 36 can be configured to output the ultrasonic beam 38 corresponding to the haptic feedback signal, and the vehicle occupant 25 can feel a sense of pressure in the haptic feedback area 40. The vehicle occupant 25 can infer the relative direction of the gesture recognition area 32 based on the position, magnitude, and the force of the haptic feedback, and the vehicle occupant 25 is thereby prompted to move the body part 29 toward the gesture recognition area 32.

In Step 78, in the method 50, the new position of the body part 29 can be specified. For example, Steps 52-76 may be repeatedly executed to thereby identify if the vehicle occupant 25 has moved the body part 29 in response to the haptic feedback such that one or more haptic feedback parameters would change, or that the body part 29 moves to the gesture recognition area 32.

If the size of the vector is less than the threshold distance, the control system 10 can infer that the body part 29 is within the gesture recognition area 32. Accordingly, in Step 80, the control system 10 can identify the gesture executed by the body part 29 in the gesture recognition area 32.

For example, the first sensor 26 may be operated to observe the first volume of space 30 to thereby specify the gesture recognition signal. The gesture recognition signal can be received by the control system 10 and processed by the first control device 14, to thereby identify the gesture executed by the body part 29 in the form of a spatial gesture model.

The control system 10 can compare the identified gesture with a database of gestures used for recognition in Step 82, and if the identified gesture corresponds to one of the gestures used for recognition, the control system 10 can output a corresponding control signal to control the behavior of the vehicle associated with the gesture for recognition.

For example, the control signal may be output to each of one or more vehicle systems (not shown) that are configured to control the vehicle behavior.

In one example, Steps 52-76 may be repeated while the body part 29 is executing a gesture so that the body part 29 remains inside the gesture recognition area 32.

Then, after Step 82, the method 50 may be repeated in order to determine whether the vehicle occupant 25 has moved the body part 29 and/or to specify a command based on another gesture.

Various changes and modifications may be made to the present invention without departing from the technical scope of the present application. For example, in the exemplary method 50 described above, if the control system 10 determines in Step 74 that the body part 29 is located within the gesture recognition area 32, haptic feedback is not output to the vehicle occupant 25. In this manner, it is possible to indicate that the body part 29 is disposed within the gesture recognition area 32 by not outputting a haptic feedback.

Figure 12:
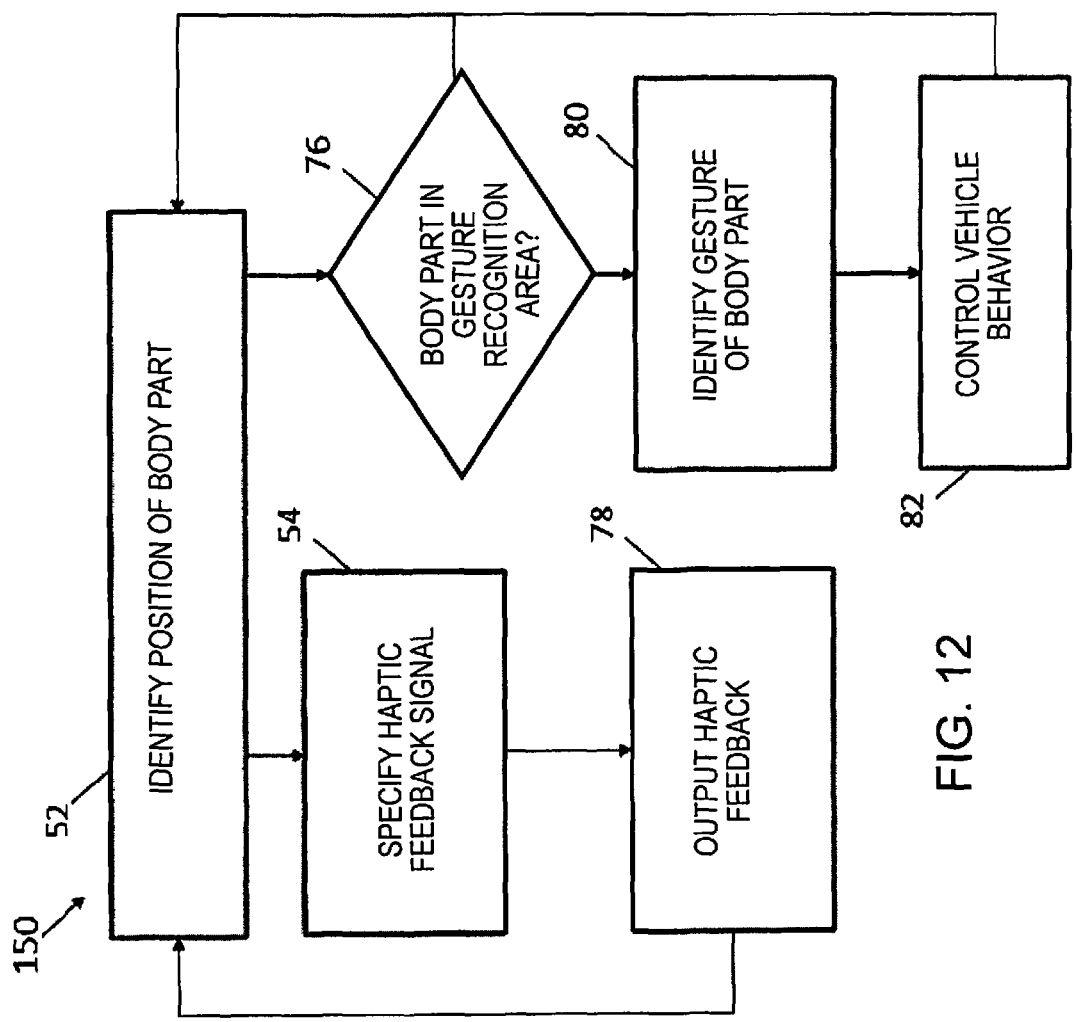
FIG. 12 is a schematic view showing another exemplary method for controlling the gesture recognition system shown in FIG. 2 according to one embodiment of the present invention.

However, as shown in FIG. 12, in another exemplary method 150 for operating the gesture recognition system 2, in Step 78 a haptic feedback signal can be output regardless of whether the control system 10 determines that the body part 29 is inside or outside of the gesture recognition area 32, as described in Step 76.

In this manner, the vehicle occupant 25 can be provided with haptic feedback configured to maintain the body part 29 inside the gesture recognition area 32 while executing a particular gesture.

Preferably, the vehicle occupant 25 can associate a specific haptic feedback sensation with an ability to control the vehicle behavior via the gesture recognition system 2. Based on this, the vehicle occupant 25 can infer that the body part 29 is located within the gesture recognition area 32.

In another exemplary method (not shown) for operating the gesture recognition system 2, which can proceed essentially the same as described above, this method can also comprise a step for specifying the position, size, and/or shape of the gesture recognition area 32 before identifying the position of the body part 29 in Step 52. The position, size, and/or shape of the gesture recognition area 32 may be changed in accordance with one or more cabin interior conditions that affect the gesture recognition ability of the sensor system 4, such as the lighting conditions of the cabin interior 12.

For example, the control system 10 may be configured to specify the gesture recognition area 32 in accordance with calibration data received from the sensor system 4 or calibration data accessed from the storage device of the first control device 14.

The calibration data may be arranged in the form of a look-up table having the corresponding shape and size of the gesture recognition area 32 as well as the position in the cabin interior 12, with respect to a prespecified range of cabin interior conditions, for example. In this manner, the control system 10 can receive an instruction for one or more cabin interior conditions, and specify the size, position, or shape of the gesture recognition area 32 based on the look-up table. Preferably, the present invention can optimize the gesture recognition area 32 for the cabin interior conditions that can change during travel, to thereby maximize the precision of the gesture recognition executed in Step 78.

Preferably, in Step 78, the haptic feedback output of the present method may be configured to reorient the body part 29 toward the optimized gesture recognition area 32. In this manner, the present method can provide an adaptive positional guide for the body part 29 in accordance with the cabin interior conditions of the vehicle 1.

The invention claimed is:

1. A control system for a gesture recognition system of a vehicle, the gesture recognition system comprising
a sensor system that observes a volume of space in a vehicle cabin interior, identifies a position of a body part of a vehicle occupant inside the volume of space, and identifies a gesture executed by the body part within a gesture recognition area defined inside the volume of space, and
a haptic feedback system that outputs non-contact haptic feedback toward the vehicle occupant,
the control system has at least one control device,
the control device is configured:
to receive from the sensor system a detection signal including information indicating the position of the body part inside the volume of space,
to identify the position of the body part with respect to the gesture recognition area in accordance with the detection signal,
to specify a haptic feedback signal based on the position of the body part with respect to the gesture recognition area, and
to output the haptic feedback signal to the haptic feedback system, and
the haptic feedback signal is configured to cause the haptic feedback system to output, toward the vehicle occupant, the non-contact haptic feedback indicating the position of the body part with respect to the gesture recognition area.

2. The control system according to claim 1, wherein
the at least one control device is configured to identify at least one of the position of the body part in the volume of space, the position of the gesture recognition area inside the volume of space, a direction of the gesture recognition area with respect to the position of the body part, a proximity of the body part to the gesture recognition area, and a distance between the body part and the gesture recognition area along a first axis, to thereby identify the position of the body part with respect to the gesture recognition area.

3. The control system according to claim 2, wherein
the haptic feedback signal is configured to cause the haptic feedback system to output the haptic feedback toward an area in the vehicle cabin interior, and
the one or more control devices are configured to specify at least one of a magnitude of the haptic feedback, a position in the cabin interior to which the haptic feedback area is oriented, and a size of the haptic feedback area, to thereby specify the haptic feedback signal.

4. The control system according to claim 3, wherein
the at least one control device is configured to specify at least one of the magnitude of the haptic feedback and the size of the haptic feedback area based on the proximity of the body part to the gesture recognition area.

5. The control system according to claim 3, wherein
the at least one control device is configured to specify the magnitude of the haptic feedback and/or the size of the haptic feedback area based on distance between the body part and the gesture recognition area along the first axis.

6. The control system according to claim 3, wherein
the at least one control device is configured to specify the position in the cabin interior to which the haptic feedback area is oriented, based on the position of the body part inside the volume of space, and the direction of the gesture recognition area with respect to the position of the body part.

7. The control system according to claim 2, wherein the at least one control device is configured
to detect a reference point of the body part and to identify a position of the reference point inside the volume of space based on the detection signal,
to compare the position of the reference point with a target position in the gesture recognition area, and
to specify a vector between the target position and the position of the reference point to thereby identify the position of the body part with respect to the gesture recognition area.

8. The control system according to claim 6, wherein the at least one control device is configured
to detect the reference point of the body part and to identify a position of the reference point inside the volume of space based on the detection signal,
to compare the position of the reference point with a target position in the gesture recognition area,
to specify a vector between the target position and the position of the reference point to thereby identify the position of the body part with respect to the gesture recognition area, and
to specify an offset point that is offset from the position of the reference point in a direction of the target position to thereby specify the position in the cabin interior to which the haptic feedback area is oriented.

9. The control system according to claim 8, wherein the at least one control device is configured to scale the vector between the target position and the position of the reference point and move the position of the reference point based on the scaled vector to thereby specify the offset point that is offset from the position of the reference point in the direction of the target position.

10. The control system according to claim 2, wherein the detection signal includes image data identified by the sensor system,
the sensor system is configured to observe the volume of space in the vehicle cabin interior, and
the at least one control device is configured to detect the body part inside the volume of space to thereby identify the position of the body part inside the volume of space based on the image data.

11. The control system according to claim 1, wherein the haptic feedback system is formed as an ultrasonic wave system including an array of a plurality of ultrasonic devices, and
the haptic feedback signal is configured to cause the haptic feedback system to output haptic feedback in the form of an ultrasonic beam.

12. A gesture recognition system comprising the control system according to claim 1, and wherein
the sensor system including at least one sensor configured to observe the volume of space in the cabin interior to thereby output to the control system a detection signal that includes information indicating the position of the body part of the vehicle occupant observed in the volume of space.

13. The gesture recognition system according to claim 12, wherein
the at least one sensor is configured to output to the control system a gesture signal that includes information indicating a gesture that is executed by the body part of the vehicle occupant within the gesture recognition area, and
the at least one control device is configured to receive the gesture signal to thereby identify the gesture that is executed by the body part in accordance with the gesture signal.

14. The gesture recognition system according to claim 12, wherein
the control system is configured to use a skeleton-based algorithm to thereby identify the gesture executed by the body part.

15. The gesture recognition system according to claim 12, wherein
the control system is configured to control at least one behavior of the vehicle in accordance with the gesture that was identified.

16. The gesture recognition system according to claim 1, further comprising
a haptic feedback system having at least one haptic feedback device configured to output the non-contact haptic feedback in accordance with the haptic feedback signal.

17. The gesture recognition system according to claim 16, wherein
the at least one haptic feedback device includes an array of a plurality of ultrasonic transducers.

18. A vehicle comprising the control system according to claim 1.

19. A method for controlling a gesture recognition system of a vehicle, the gesture recognition system comprising a sensor system equipped with at least one sensor configured to observe a volume of space in a vehicle cabin interior, and a haptic feedback system configured to output non-contact haptic feedback toward a vehicle occupant in the cabin interior,
the method comprising:
a step for observing a volume of space and controlling the sensor system so as to specify a detection signal including information indicating a position of a body part of the vehicle occupant inside the volume of space;
identifying the position of the body part with respect to a gesture recognition area defined inside the volume of space in accordance with the detection signal,
specifying a haptic feedback signal based on the position of the body part with respect to the gesture recognition area; and
controlling a haptic feedback system based on the haptic feedback signal, and
the haptic feedback signal being configured to cause the haptic feedback system to output the non-contact haptic feedback indicating the position of the body part with respect to the gesture recognition area toward the vehicle occupant.

* * * * *